(12) United States Patent
Sonnier

(10) Patent No.: US 6,687,803 B1
(45) Date of Patent: Feb. 3, 2004

(54) PROCESSOR ARCHITECTURE AND A METHOD OF PROCESSING

(75) Inventor: David P Sonnier, Austin, TX (US)

(73) Assignee: Agere Systems, Inc., Allentown, PA (US)

( * ) Notice: Subject to any disclaimer, the term of this patent is extended or adjusted under 35 U.S.C. 154(b) by 146 days.

(21) Appl. No.: 09/798,130

(22) Filed: Mar. 2, 2001

Related U.S. Application Data

(60) Provisional application No. 60/186,516, filed on Mar. 2, 2000, and provisional application No. 60/186,424, filed on Mar. 2, 2000.

(51) Int. Cl.$^7$ .............................................. G06F 12/00
(52) U.S. Cl. ...................... 711/168; 711/130; 711/169; 710/52; 710/53; 345/545
(58) Field of Search ................................. 711/129, 130, 711/140, 147–148, 153, 168–169; 710/52–53, 58; 345/530–557

(56) References Cited

U.S. PATENT DOCUMENTS

| | | | |
|---|---|---|---|
| 5,224,213 A | * | 6/1993 | Dieffenderfer et al. ....... 710/53 |
| 5,559,952 A | * | 9/1996 | Fujimoto ..................... 345/557 |
| 5,657,478 A | * | 8/1997 | Recker et al. ............... 345/503 |
| 5,768,624 A | * | 6/1998 | Ghosh .......................... 710/53 |
| 6,170,046 B1 | * | 1/2001 | Joffe et al. ................... 711/169 |

* cited by examiner

*Primary Examiner*—Nasser Moazzami

(57) ABSTRACT

A processor architecture including a processor and local memory arrangement where the local memory may be accessed by the processor and other resources at substantially the same time. As a result, the processor may initiate a new or current process following a previous process without waiting for data or instructions from external resources. In addition, the loading of data for the next or subsequent process, the execution of a current process, and the extraction of results of a previous process can occur in parallel. Further, the processor may avoid memory load stall conditions because the processor does not have to access an external memory to execute the current process. In another embodiment, the local memory may be dynamically reallocated so that results from a previous process stored in the local memory may be accessed by the processor for a current process without accessing an external memory.

16 Claims, 5 Drawing Sheets

PROCESSOR ARCHITECTURE AND A METHOD OF PROCESSING

RELATED APPLICATIONS

This application claims priority from U.S. Provisional Application Serial No. 60/186,516 entitled "RSP" and filed on Mar. 2, 2000 and U.S. Provisional Application Serial No. 60/186,424 entitled "FPP" and filed on Mar. 2, 2000. Each of these provisional applications is incorporated herein by reference. This application is also related to patent application entitled "PAYLOAD ARCHITECTURE" filed on Mar. 2, 2001. This application is incorporated herein by reference.

FIELD OF THE INVENTION

The present invention relates generally to network processors and, more particularly, to a processor architecture that may be useful in a network processor.

BACKGROUND OF THE INVENTION

Communication systems are continually undergoing increased demands to process data at every increasing speeds. Accordingly, there is a need to provide processor architectures that can operate in communication systems at these increased speeds.

SUMMARY OF THE INVENTION

The present invention provides a processor architecture including a processor and local memory arrangement where the local memory may be accessed by the processor and other resources at substantially the same time. As a result, the processor may initiate a new or current process following a previous process without waiting for data or instructions from external resources. In addition, the loading of data for the next or subsequent process, the execution of a current process, and the extraction of results of a previous process can occur in parallel. Further, the processor may avoid memory load stall conditions because the processor does not have to access an external memory to execute the current process.

In another embodiment, the local memory may be dynamically reallocated so that results from a previous process stored in the local memory may be accessed by the processor for a current process without accessing an external memory.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice in the semiconductor industry, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
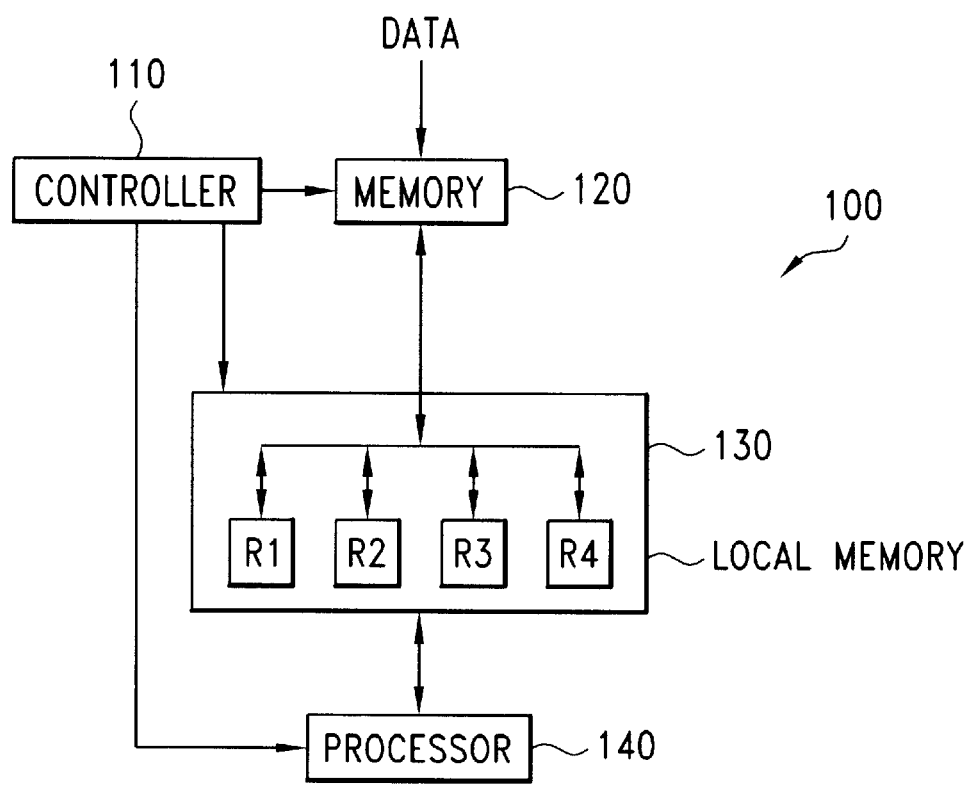
FIG. 1 is a block diagram of a processor architecture according to an illustrative embodiment of the present invention.

Referring now to the drawing, wherein like reference numerals refer to like elements throughout, FIG. 1 is a block diagram of an illustrative processor architecture 100 according to the present invention. The processor architecture 100 includes a controller 110, a local memory 130, and a processor 140. The processor 140 may be a digital signal processor, a microcontroller, or other circuitry capable of implementing computations or processes. The controller 110 may be logic or other combination circuitry. The local memory 130 may be a RAM, a register, or other circuitry capable of having data loaded into and retrieved from it. The processor architecture 100 may interface with a memory 120, logic (not shown) or other circuitry (not shown). While the illustrative embodiments describes the operation of the processor architecture 100 with reference to the memory 120, the basic operation of the processor architecture 100 remains the same when interacting with, for example, logic or other circuitry.

Briefly, the local memory 130 is divided into two or more memory regions, which may be accessed by the processor 140 or external circuitry such as memory 120. The illustrative embodiment includes, for example, four memory regions R1, R2, R3, and R4. Data may be loaded into or retrieved from the local memory 130 and provided to the processor 140 and the memory 120 in parallel at substantially the same time. In other words, while data is loaded or retrieved from the local memory 130 by, for example, the processor 140, data may be retrieved or loaded into the local memory 130 from the memory 120. Data may include all of a subset of the data to be processed by the processor 140, data (instructions) identifying which process is to be performed by the processor 140, and data (such as filter coefficients, conversion factors, etc.) used by the processor when manipulating the data to be processed.

As a result, the processor 140 may initiate a new or current process after a previous process without waiting for data or instructions to be provided from external resources. In addition, the loading of data for the next process, the execution of a current process, and the extraction of results from a previous process can occur in parallel. Further, the processor 140 may avoid memory load stall conditions because the processor 140 does not have to access an external memory to execute the current process.

Figure 2:
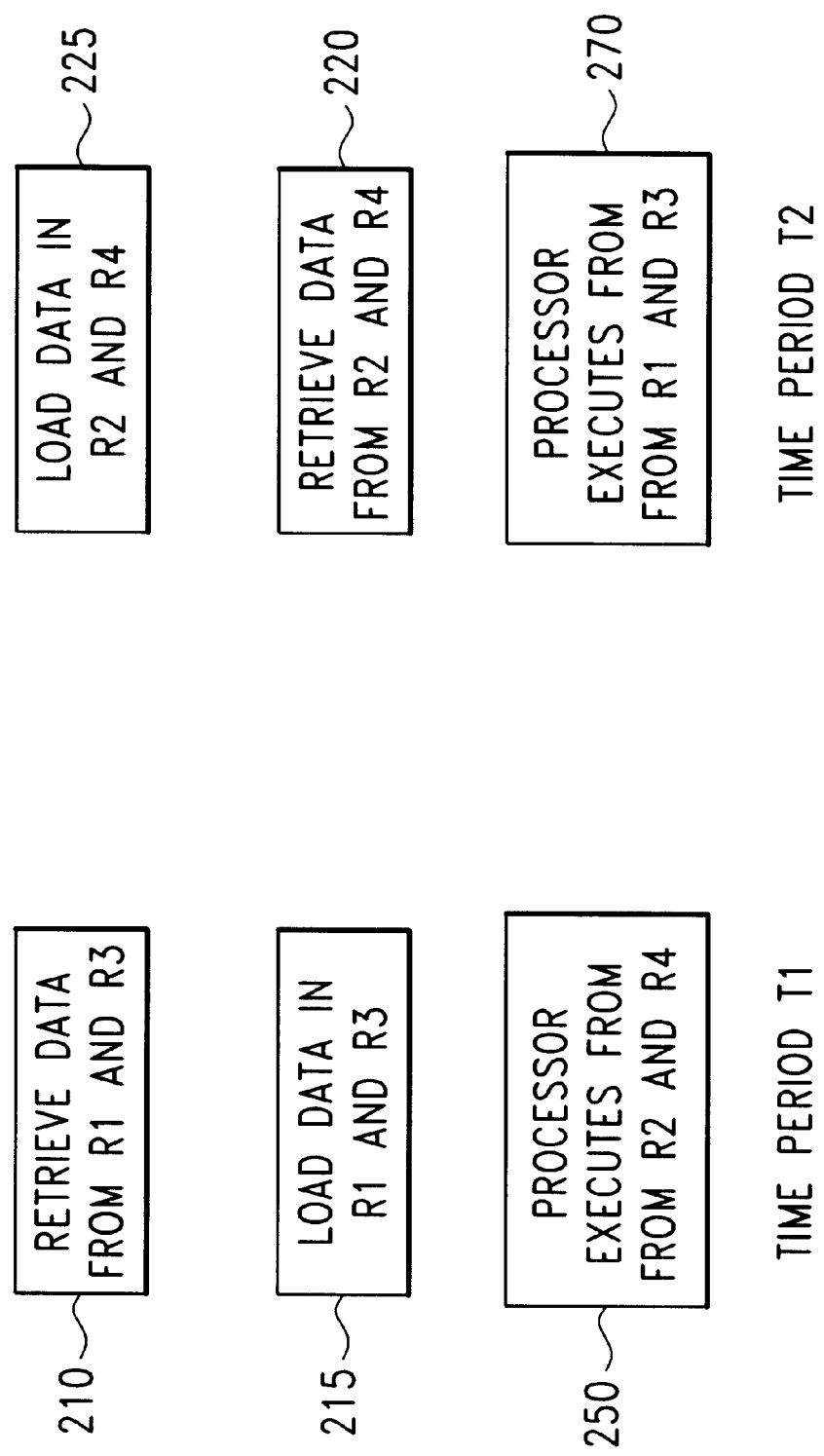
FIG. 2 is a diagram illustrating parallel processing operations of the processor architecture shown in FIG. 1.

FIG. 2 illustrates the parallel operations of the processor architecture 100 shown in FIG. 1. During time period T1, data is loaded during a load operation 215 from the memory 120 into the memory regions R1 and R3 in the local memory 130. In addition, data is retrieved during a retrieve operation 210 from the memory regions R1 and R3. While FIG. 2 illustrates that the retrieve operation 210 occurs prior to the load operation, these operations may be alternated, rearranged, or occur at substantially the same time. These operations may be rearranged or alternated as long as data that has been stored in the local memory 130 by the processor 140 is retrieved before it is overwritten by the loading of data into the local memory 130.

During time period T1, the processor 140 retrieves data from the memory regions R2 and R4, executes a process using the retrieved data, and loads the result(s) of the process into the memory regions R2 and R4 (identified collectively as 250). The processor 140 is electrically coupled to the controller 10 which is also electrically coupled to the local memory 130 and the memory 120. The controller 110 provides control signals to the memory 120, the local memory 130, and the processor 140 to manage the data that is retrieved from and loaded into the local memory. For example, during time period T1, the controller provides the processor 140 a start command and a start address for the local memory 130 to initiate the operation of the processor 140 and to point to the initial memory address from which the processor initiates the process.

The processor 140 may include or have access to one or more processes that can be executed by the processor 140. The processes may include processes to filter data, processes to transform data from one format to another format, or other processes that are used to manipulate data. The data that is loaded into the local memory may include instructions identifying which one of the processes that should be implemented by the processor 140 during that time period. In addition, the processes may be structured to cause the processor 140 to load the output or results of the process into a predetermined address location in the local memory. In this way, the controller 10 can identify the address of the data that is to be retrieved from local memory 130 and loaded into the memory 120. The controller 110 stores the process that was implemented and/or the addresses where the results of the previous process have been stored in the local memory 130.

At the beginning of time period T2, access to the memory regions R1, R2, R3, and R4 is switched. During the period T2, data stored in the memory regions R2 and R4 during the previous time period T1 by the processor 140 is retrieved by a retrieve operation 220 from the memory regions R2 and R4 and provided to, for example, the memory 120. In addition, data for a subsequent process is loaded during a load operation 225 from the memory 120 into the memory regions R2 and R4. These operations are the same as those in time period T1. In addition, during time period T2, the processor 140 retrieves data from the memory regions R1 and R3, executes a current process using the retrieved data, and loads the result(s) of the process into the memory regions R2 and R4 (identified collectively as 270). The processes shown during time periods T1 and T2 are alternated overtime.

Figure 3:
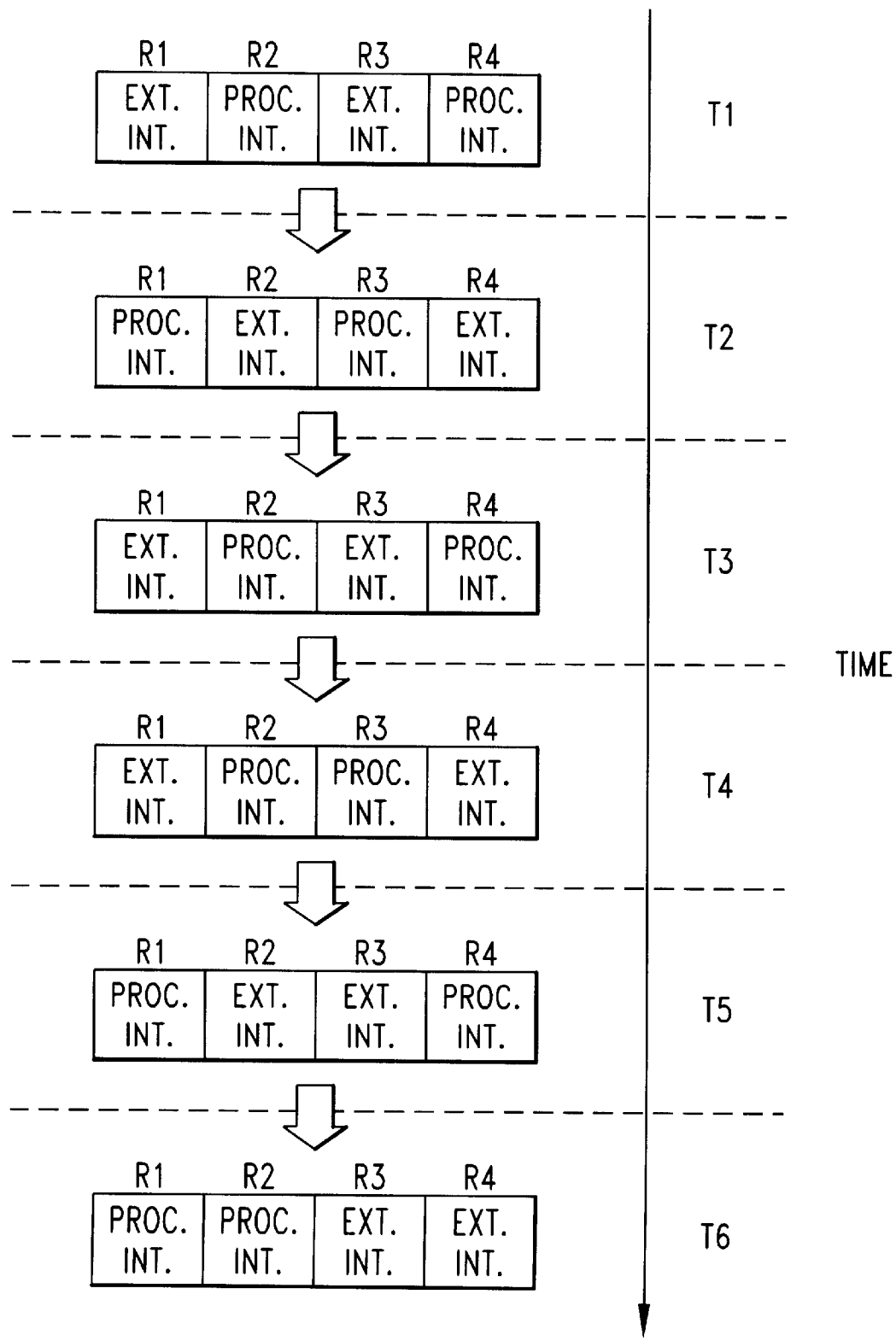
FIG. 3 is a diagram illustrating a memory allocation of the local during different time periods.

While the process shown in FIG. 2 illustrates the process of alternating between memory regions R1 and R3 and memory regions R2 and R4, the memory regions R1, R2, R3, and R4 may be dynamically allocated. Thus, the results of a previous process stored in the local memory 130 may be accessed by the processor 140 for a current process without accessing an external memory. This process is illustrated in FIG. 3 which illustrates the allocation of the memory during successive time periods. PROC. LNT. indicates the processor 140 is retrieving or loading data into the identified memory region (i.e. the processor has access to those memory regions) and EXT. INT. indicates that data is being retrieved from or loaded into the identified memory region from an external source (i.e. external resources have access to those memory regions).

At time period T1, the processor 140 may access memory regions R2 and R4 and memory regions R1 and R3 are accessible by external circuitry. At time period T2, the memory regions are switched. Again, at time period T3, the memory regions are switched. Thus, the allocation of each memory region is switched during the first three time periods. At time period T4, memory region R2 remains allocated to the processor 140. In this case, during a previous process the processor 140 may have loaded data into the memory R2 that would be used during a subsequent process of the processor during a subsequent time period. Accordingly, the memory region remains allocated to the processor 140 so that the loaded data may be retrieved without accessing an external memory or without waiting for a further subsequent time period for the memory to be reallocated for use by the processor 140. The subsequent time periods T5 and T6 illustrate further examples of the allocation of the memory regions.

Figure 4:
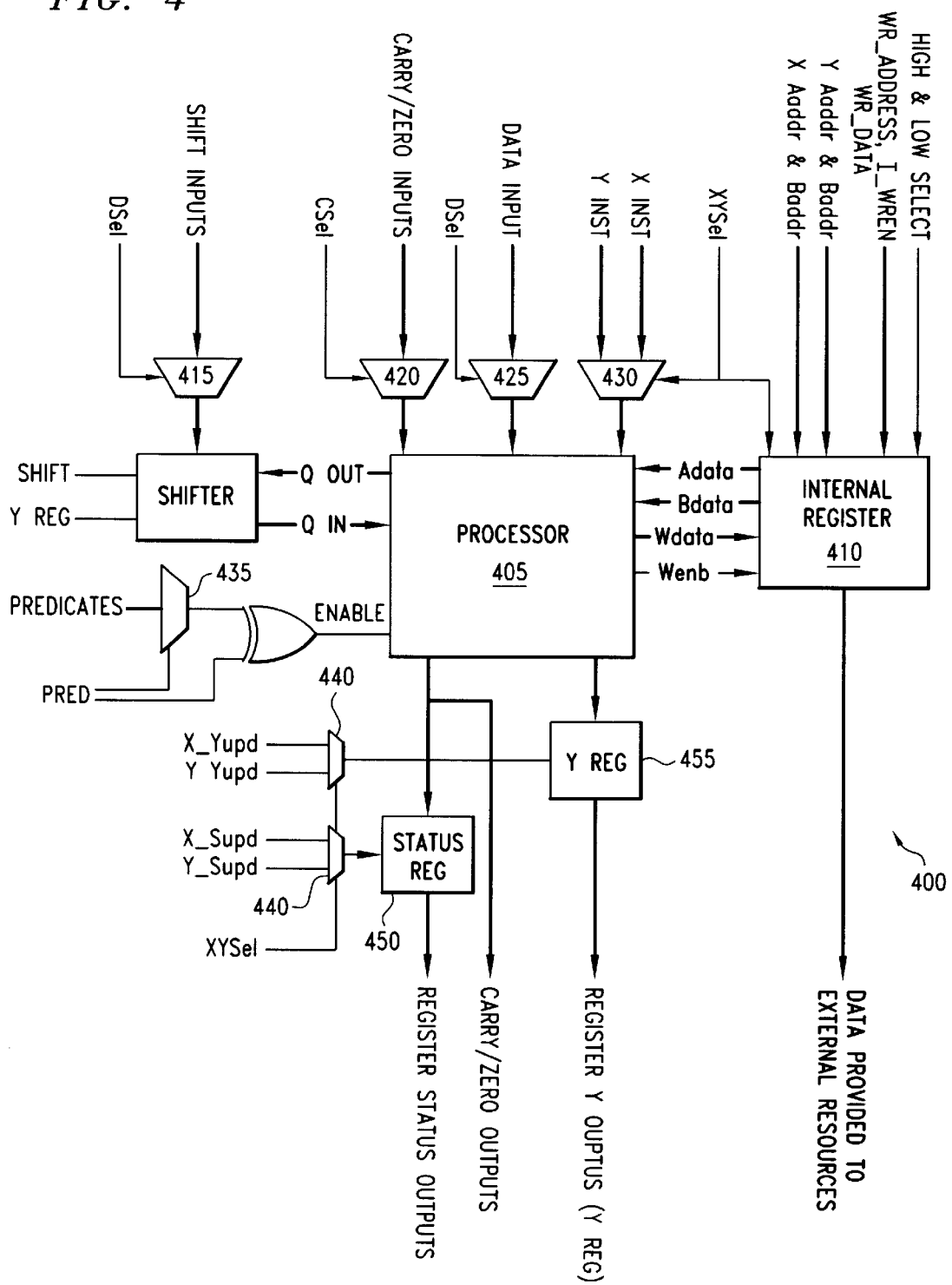
FIG. 4 is a block diagram of a processor architecture according to a further illustrative embodiment of the present invention.

FIG. 4 is an illustrative embodiment of another processor architecture 400. The processor architecture 400 includes a processor 405 that interfaces directly with an internal register (local memory) 410. The processor 405 is, for example, a AMD 2901 bit slice architecture available from Advanced Micro Devices. The internal register 410 is loaded and unloaded so that data may be provided to external memory (not shown), logic (not shown), or circuitry (not shown), under the control of a controller (not shown). The internal register 410 is 128 bytes total size configured as 32*8 bits*4. The processor 405 is capable of addressing up to 128 bytes.

In order to maintain speed of the processor 405, the internal register 410 is at least doubled in size and ping-ponged via control from external logic such as the controller. In this way, a segment (portion) of the internal register 410 can be loaded and unloaded by external resources while the processor 405 utilizes the remaining segment (portion) of the internal register 410. In addition, the internal register 410 is logically subdivided. This allows half (½) of the internal register 410 to be used in a back to back computation when the same parameters will be used again. In this case, only half (½) of the internal register 410 is ping-ponged for access by external resources.

The processor architecture 400 also includes multiplexers 415, 420, 425, 430, 435, and 440 to select and control the data that is provided to and retrieved from the processor architecture 400. Also provided are carry and shift inputs, as well as the registers 450, 455 to hold the registered outputs including the carry and shift outputs. The processor architecture is provided a number of inputs including a start signal to start the processor 405 on a new execution thread. In addition, a start address is provided to identify the start address in the internal register 410 for the processor 405.

The processor architecture 400 and/or the controller may be provided the capability to individually select any two of four possible RAMs 510, 515, 520, 525 (shown in FIG. 5) of the internal register 410. This allows for granularity where only a portion of the memory allocated for the processor 405 will be swapped or allocated to the external resources. For example, if one of the RAMs 510, 515, 520, 525 contains static/dynamic parameters associated with a current process and the next process needs access to the static/dynamic parameters, then that RAM will not be switched (reallocated).

The controller is allocated the tasks of having data read (unloaded) from the internal register 410 and provided to external memory or other logic blocks that need the data. In addition, the controller has data inserted (loaded) into the internal register 410 before starting the execution of the processor 405. The data loaded into the internal register 410 may include all the parameters necessary to enable the processor 405 to perform a computation in a subsequent time period. The processor 405 then computes the results during the subsequent time period and the results are retrieved from the internal register 410 in a further subsequent time period.

The following table identifies the control signals and interfaces used by the processor architecture 400 and the controller to manipulate the internal register 410.

| Processor Ports | | | |
|---|---|---|---|
| Port | Type | Bit | Description |
| Pred | In | 4 | Predicate selector |
| xy_sel | In | 1 | X/Y Select |
| Csel | In | 3 | Carry/shift input select |
| dsel | In | 3 | D input select |
| x_inst | In | 9 | Operation code |
| x_Aaddr | In | 5 | Processor read only port address |
| x_Baddr | In | 5 | Processor read/write port address |
| x_yupd | In | 1 | Update Y outputs |
| x_supd | In | 1 | Update status outputs |
| y_inst | In | 9 | Operation code |
| y_Aaddr | In | 5 | Processor read only port address |
| y_Baddr | In | 5 | Processor read/write port address |
| y_yupd | In | 1 | Update Y outputs |
| y_supd | In | 1 | Update status outputs |
| predicates | In | 8 | predicate vector |
| low_select | In | 1 | Function select for lower bank of RAM (e.g., 510, 520) |
| high_select | In | 1 | Function select for upper bank of RAM (e.g., 515, 525) |
| wr_address | In | 4 | External memory read address |
| l_wren | In | 1 | External write enable |
| Wr_data | In | 8 | External write data |

Figure 5:
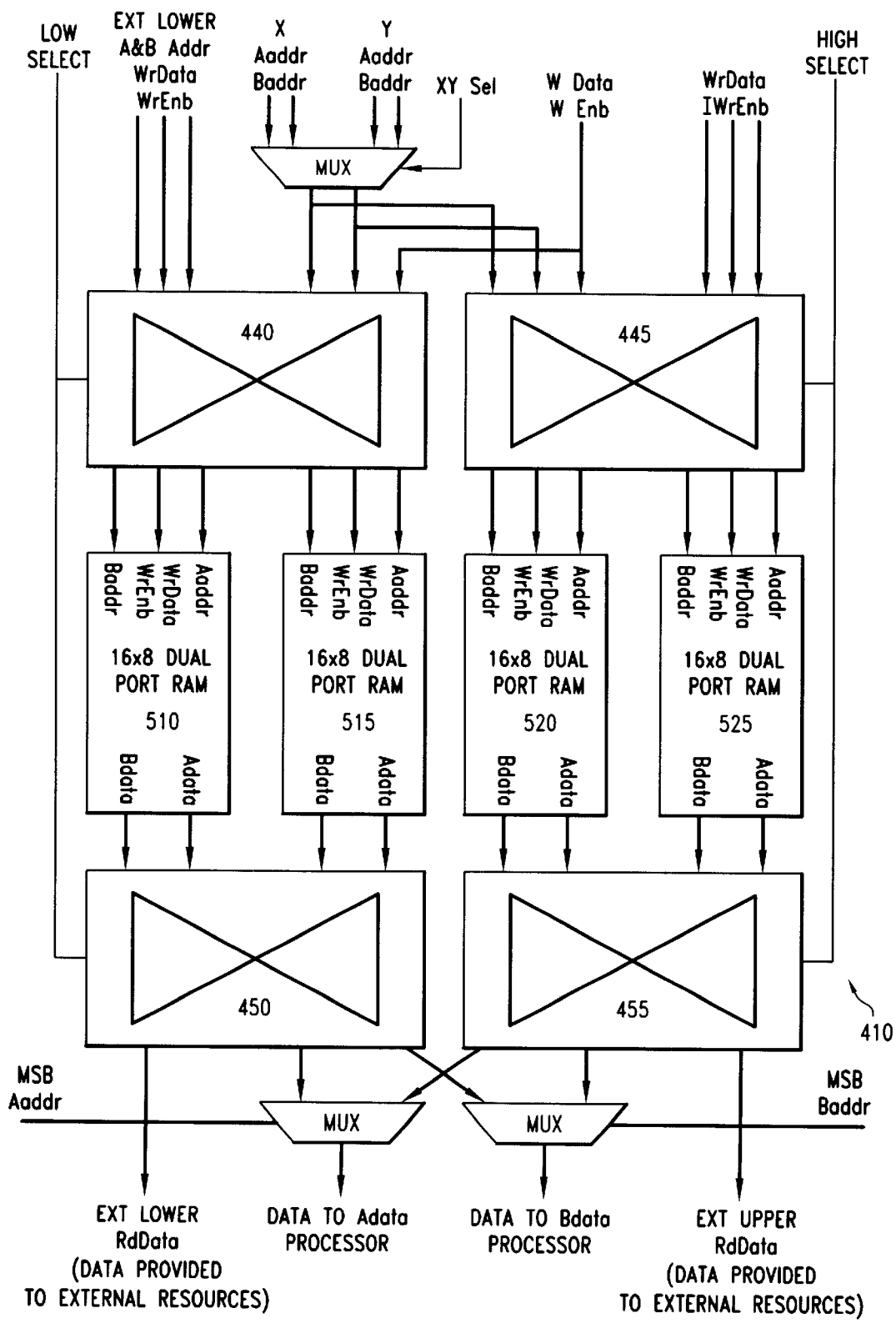
FIG. 5 is a detailed block diagram of an illustrative internal register shown in FIG. 4.

A more detailed block diagram of the internal register 410 is shown in FIG. 5. The internal register is composed of four 16×8 dual ported Rams 510, 515, 520, 525. Each RAM 510, 515, 520, 525 has one read/write port and one read only port. At any time, two of the RAMs 510, 515, 520, 525 are accessible to the processor 405 while the other two are available for loading/unloading under the control of the controller.

Accesses from the processor 405 are divided by an upper/lower address (the MSB of the address). For writes to the RAMs 510, 515, 520, 525, the write enable to the RAM array is gated off the MSB. For reads from the RAMs 510, 515, 520, 525, the data multiplexer is selected by the MSB of the processor address. The external logic has dedicated ports for the upper/lower banks of RAM. One port is write only, the other port is read only. This simplifies the crossbars 440, 445, 450, 455 on the input side and eliminates some output multiplexers on the output side.

Although the invention has been described with reference to exemplary embodiments, it is not limited to those embodiments. Rather, the appended claims should be construed to include other variants and embodiments of the invention, which may be made by those skilled in the art without departing from the true spirit and scope of the present invention.

What is claimed:

1. A method of processing, comprising:
   providing a processor coupled to a local memory that is logically divided into memory regions;
   accessing during a first time period two regions of said memory regions with said processor and other two regions of said memory regions with an external circuitry;
   accessing during a successive time period said two regions with said external circuitry and said other two regions with said processor; and
   accessing during a further successive time period said two regions and said other two regions with said processor and said external circuitry based on a dynamic allocation of said memory regions, thereby one of the other two regions remains allocated to the processor, so that the processor can retrieve data therefrom.

2. The method as recited in claim 1 wherein said dynamic allocation is based on a subsequent process of said processor.

3. The method as recited in claim 1 wherein said dynamic allocation is based on a current process of said processor.

4. The method as recited in claim 1 wherein said local memory is divided into four memory regions.

5. The method as recited in claim 1 wherein said local memory is an internal register.

6. The method as recited in claim 1 wherein said local memory is a RAM.

7. The method as recited in claim 1 wherein said local memory is at least double the size of a processing capability of said processor.

8. The method as recited in claim 1 wherein said local memory is ping-ponged via control from an external logic.

9. A processor architecture, comprising:
   a processor; and
   a local memory that is logically divided into memory regions, two of the memory regions being accessed by said processor and other two memory regions being accessed by an external circuitry during a first time period, said two regions are accessed with said external circuitry and said other two regions are accessed with said processor during a successive time period, said two of the memory regions and said other two memory regions being accessed by one of said processor and said external circuitry during a further successive time period based on a dynamic allocation, thereby one of the other two memory regions remains allocated to the processor, so that the processor can retrieve data therefrom.

10. The processor architecture as recited in claim 9 wherein said dynamic allocation is based on a subsequent process of said processor.

11. The processor architecture as recited in claim 9 wherein said dynamic allocation is based on a current process of said processor.

12. The processor architecture as recited in claim 9 wherein said local memory is divided into four memory regions.

13. The processor architecture as recited in claim 9 wherein said local memory is an internal register.

14. The processor architecture as recited in claim 9 wherein said local memory is a RAM.

15. The processor architecture as recited in claim 9 wherein said local memory is at least double the size of a processing capability of said processor.

16. The processor architecture as recited in claim 9 wherein said local memory is ping-ponged via control from an external logic.

* * * * *